Nov. 25, 1952  R. M. WILEY  2,619,256
WEIGH FEEDER

Filed Dec. 9, 1949  3 Sheets-Sheet 1

INVENTOR.
Ralph M. Wiley
BY
Griswold & Burdick
ATTORNEYS

Nov. 25, 1952 — R. M. WILEY — 2,619,256
WEIGH FEEDER
Filed Dec. 9, 1949 — 3 Sheets-Sheet 3

INVENTOR.
Ralph M. Wiley
BY
Griswold & Burdick
ATTORNEYS

Patented Nov. 25, 1952

2,619,256

UNITED STATES PATENT OFFICE 2,619,256

WEIGH FEEDER

Ralph M. Wiley, Midland, Mich., assignor to The Dow Chemical Company, Midland, Mich., a corporation of Delaware Application December 9, 1949, Serial No. 132,167

7 Claims. (Cl. 222—55)

The invention relates to apparatus adapted to automatically and continuously regulate accurately the rate of flow of a comminuted solid material from one place to another. It is more particularly concerned with an improved apparatus adapted to convey a free-flowing comminuted solid at a predetermined and automatically controlled rate from a supply hopper to a chute which may be arranged to deliver the solid to the point of use.

In industry, there is oftentimes a need for adding one material to another at a precisely controlled rate. As an example, one may cite the addition of coloring matter to a plastic molding composition during its formulation. In this operation, the separate solid ingredients, including the coloring matter, are led from supply hoppers in free-flowing streams to a mixer which mixes the ingredients continuously to form an intimately mixed product. In order to obtain consistency of proportions of the ingredients, it is essential that precise rates of feed of the ingredients be maintained because a relatively slight irregularity in the rate of feed of the coloring matter, for example, adversely affects the uniformity of coloring of the mixed product. In the usual formulation of colored plastic molding compositions, only a relatively small volume of the coloring component is fed into the mixer compared to the volume of the other ingredients. This accentuates the problem of obtaining accuracy in feeding rate. Insofar as I am aware, there is no commercially available apparatus for very accurately regulating feed rates of a comminuted solid, particularly at relatively low rates of flow.

It is the principal object of the invention to provide a weighing conveyer feeder which will convey a comminuted solid from a supply source to another place at a precisely regulated rate. Other objects and advantages will appear as the description of the invention proceeds.

In accomplishing these and other objects of the invention, I have provided the improved apparatus, a preferred form of which is illustrated in the accompanying drawings wherein:

Fig. 5 is an enlarged plan view of a portion of the balance platform.

In the several figures, like numerals designate like parts.

Figure 1:
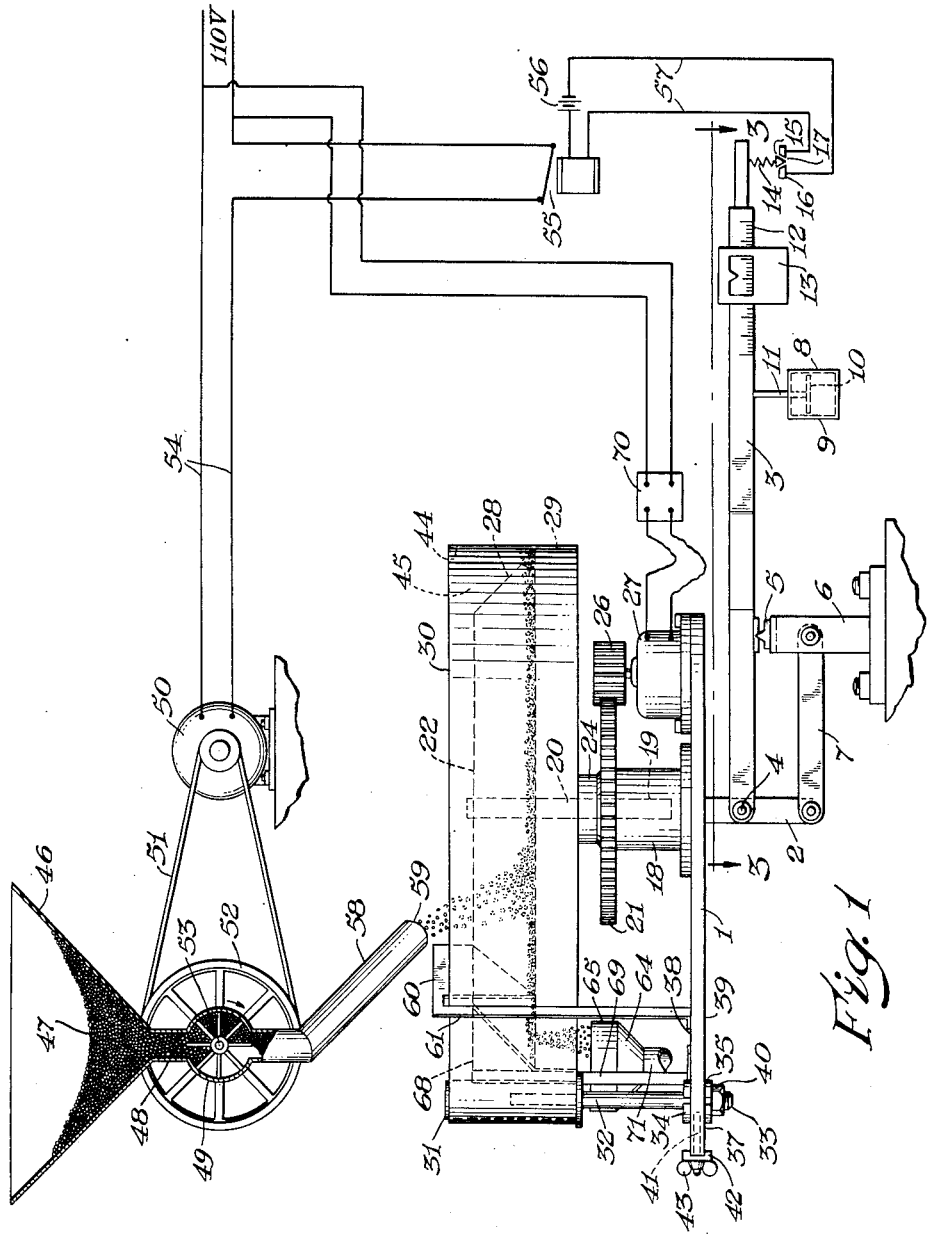
Fig. 1 is a side elevation of the apparatus.

Referring to the drawings in detail, there is shown a balance platform 1 carried by supports 2. The supports 2 are carried by the bifurcated balance beam 3 to which they are pivoted by pivots 4. The balance beam 3 is supported by the fulcrums 5 on columns 6. The supports 2 are maintained vertical, as the balance beam 3 swings, by the links 7, one end of each of which is pivoted to the columns 6, the other end of each of which is pivoted to the supports 2 so that the links 7 are parallel to the balance beam. A dash pot 8 is provided for damping the swings of the balance beam. It consists of a cylinder 9 in which is piston 10 attached to the balance beam 3 by the piston rod 11. The piston is slightly smaller in diameter than the cylinder bore. The outer end 12 of the balance beam is provided with the movable counterpoise 13. The outer end 12 also carries a spring 14 on the lower end of which is the switch element 15, such as a V-shaped piece of metal which short circuits the switch contacts 16 and 17 when the outer end of the balance beam tips downwardly to bring the V-shaped piece of metal into contact with both contacts 16 and 17.

As shown, the balance platform 1 carries a spindle support 18 having a central vertical bore 19 in which spindle 20 stands and is capable of turning as in a bearing. Mounted on spindle 20 is the cog wheel 21 which supports, and is dowelled to, the partially beveled pulley wheel 22 by dowells 23 extending from the hub 24 of the cog wheel to the hub 25 of the pulley wheel 22. The cog wheel is driven by the pinion gear 26 of synchronous motor 27 which is also mounted on the balance platform 1.

The rim of pulley wheel 20 has a conical face portion or bevel 28 and a cylindrical face portion 29. The bevel makes an angle with respect to the horizontal at least equal to the slide angle of the granular material to be handled. On the cylindrical face 29 runs the flexible endless flat belt 30 which is kept taut by idler pulley 31. Pulley 31 is journaled on spindle 32. The lower end 33 passes through the mounting flanges 34 and 35 and the slot 36 in the end 37 of the balance platform 1. The mounting flanges 34 and 35 are clamped against the top and bottom faces 38 and 39, respectively, of the end 37 of the balance platform by the nut 40. Threaded bolt 41 having one end secured to the clamping flange 34 and the other passing through the end piece 42 is used, with the wing nut 43, to adjust the tension of the belt 30.

The inside 44 of the belt 30 cantacts the cylindrical portion 29 of the pulley wheel 22, thereby making a V-shaped trough 45 between the bevel portion 28 of the pulley wheel 22 and the upstanding portion of the belt riding above the cylindrical portion 29 of the pulley wheel 22.

Arranged above the V-shaped trough 45 is a supply hopper 46 for holding a supply of granular material 47, the rate of delivery of which is to be regulated. As shown, the supply hopper is provided with an outlet 48 communicating with a flow regulator such as the star feeder 49 which controls the flow of material from the hopper. The star feeder is driven by motor 50 through belt 51 and pulley 52 attached to the spindle 53 of the star feeder 49. The power supply 54 to motor 50 is controlled by relay 55 which in turn is operated by the switch contacts 16 and 17 and battery 56 through leads 57. Granular material released from hopper 46 passes through conduit 58 provided with the outlet 59 which is arranged over the aforesaid V-shaped trough 45 at a position close to one of the two points at which the belt 30 is tangent to the pulley wheel 22 so that granular material falling from the outlet 59 is deposited in one end of the trough 45, that is the receiving end, as shown.

A baffle 60 supported by bracket 61 attached to the balance platform 1 is arranged in, but not quite touching, the V-shaped trough 45 to prevent granular material 62 riding in the trough from falling off between the tangential portion 63 of the belt and the conical face of pulley wheel 22.

Below the belt 30 at the side of the beveled pulley 22 opposite to outlet 59 is disposed the collecting funnel 64. As shown, the top 65 of the funnel is more or less oblong and disposed below the opening 66 between the tangential portion 67 of the belt and the beveled wheel 22 at the discharge end of the trough 45. A baffle 68 is supported by bracket 69 attached to balance platform 1 is arranged in the V-shaped trough 45, in similar manner to baffle 60 between the idler pulley and the opening 66, to aid in guiding material from the bevel 28 to the funnel 64.

With the foregoing device, it will be observed that the entire weight on the balance platform 1, which includes the weight of the pair of pulley wheels, their supporting means, the belt 30, and baffles 60 and 68, as well as any granular material deposited in the trough 45, is transmitted by common support through pivots 4 to the short left arm of the balance beam 3 and is, therefore, capable of being balanced by the longer right-hand arm of the balance beam and counterpoise 13. The counterpoise 13 is made of sufficient weight to maintain the beam 3 in a substantially horizontal position when the trough 45 is empty. In this balanced position, which corresponds to the tare, switch element 15 is merely on the verge of closing contacts 16 and 17. If desired, the scale markings on the balance beam 3 may be positioned to show the actual weight of granular material in the trough 45 for various positions of the counterpoise.

Figure 2:
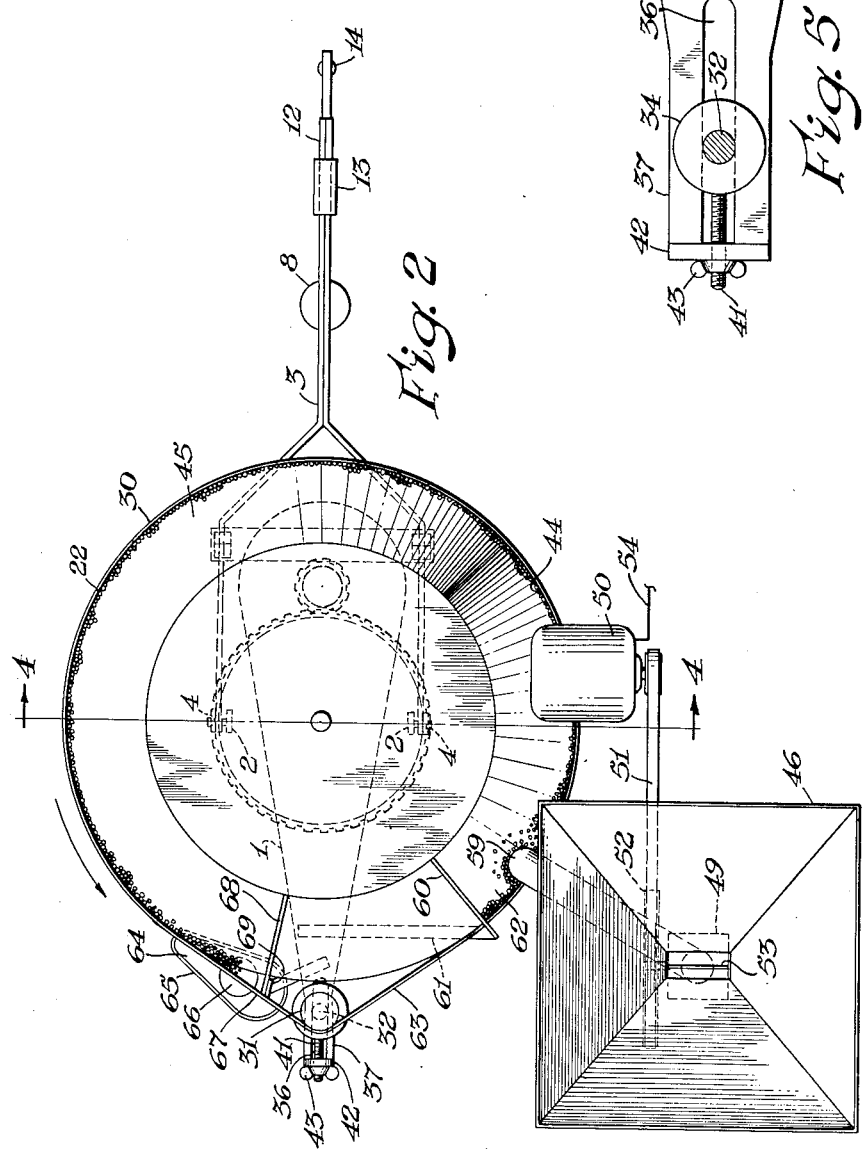
Fig. 2 is a plan view of the same.
Figure 3:
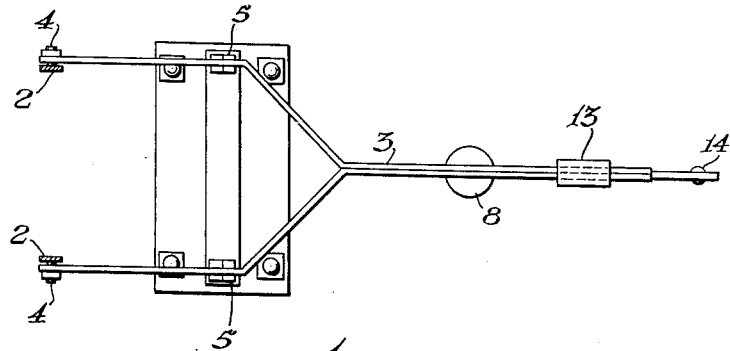
Fig. 3 is a horizontal section on the line 3—3 of Fig. 1.
Figure 4:
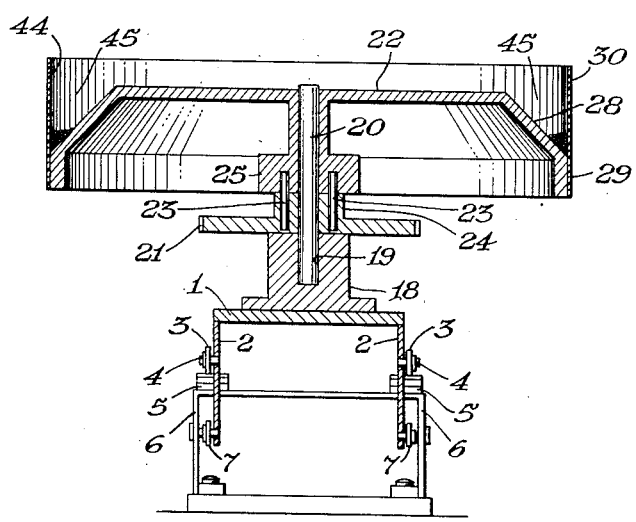
Fig. 4 is a vertical section on the line 4—4 of Fig 2.

In operation, motor 27 is started by closing switch 70. Motor 27 revolves pinion gear 26, thereby turning cog wheel 21 and pulley wheel 22, the direction of rotation being as indicated in Fig. 2. As pulley wheel 22 turns, belt 30, which frictionally engages the face of the cylindrical portion 29 of the pulley wheel 22, travels in the same direction around both pulley wheel 22 and idler pulley 31. The resulting belt motion in conjunction with the bevel 28 produces a conveying action in trough 45, the trough having a length equal to the length of the portion of the belt in contact with wheel 22.

The counterpoise 13 is moved along the balance beam 3 to a point at which the weight of the balance platform 1 and the apparatus thereon including the conveying trough 45 is just balanced (tare position) and the switch element 15 does not short contacts 16 and 17. In this balanced position of the beam 3, no material will be discharged from the hopper 46. In order to start the flow of material from the feed hopper, the counterpoise is moved slightly toward the right-hand end (12), beyond the foregoing balancing point, thereby overbalancing the weight of the balance platform 1 (and apparatus carried thereby). In this overbalanced condition, the end 12 of the balance beam 3 tilts downward, thereby moving the switch element 15 into contact with both contacts 16 and 17 shorting them. The shorting of contacts 16 and 17 closes the relay 55, thereby starting motor 50. Motor 50 then operates the star feeder 49 causing granular material 47 from hopper 46 to be released. The released material passes through conduit 58 and falls out of opening 59 into trough 45. As the granular material thus falls, it becomes spread along the trough 45, the spreading resulting from the motion of the trough 45 under the opening 59 of the conduit as wheel 22 revolves. The granular material thus spread along the trough increases the load upon the balance platform 1 by an amount equal to the weight of granular material thus deposited if none falls off. When the increase in weight is sufficient to overcome the balancing effect of the counterpoise 13, the balance beam end 12 tilts upwardly, thereby lifting element 15 and thus opening contacts 16 and 17 which open relay 55 shutting down the motor 50 and the feeder 49. When the feeder 49 is thus shut down, the load upon the balance platform 1 no longer increases. Meanwhile, the continued rotation of the wheel 22 conveys granular material in the trough 45 to the opening 66 between the wheel 22 and the tangential portion 67 of the belt. At this point, material falls off the bevel 28 of wheel 22 into the collecting funnel 64 from which it may be delivered by gravity through conduit 71, acting as a chute, to a point of use. As the material falls off the bevel 28, the load on the balance platform 1 progressively is decreased by an amount equal to the weight of the dropped material. The resulting unbalance of the balance platform 1 causes the balance beam end 12 to tilt downwardly, thereby moving the switch element 15 into short circuiting position between contacts 16 and 17. The shorting of contacts 16 and 17 restarts motor 50 and the feeder 49, thereby feeding additional material from the supply hopper onto the trough 45. This feeding of the material onto the trough continues as before until the load on the balance platform 1 overbalances the counterpoise 13 and causes the switch element to again open the circuit of motor 50 and stop the feeder 49. It will be observed that dash pot 8 serves to damp the swings of the balance and thus prevent undue hunting.

In effect, the resulting periodic feeding of the trough 45 from the supply hopper as the cycle of operations repeats is more or less smoothed out due to the spreading effect of gravity as the material is deposited in the trough so that there results a comparatively smooth flow of material from the apparatus at a fixed average rate which depends upon the position of the counterpoise on the balance beam. It will be apparent that the more the counterpoise 13 is moved to the right beyond the tare point, the greater the inventory weight of granular material in the trough 45 before the end 12 of the balance beam 3 tilts upwardly and thus stops the feeder 49; and, since the wheel 22 turns at a constant rate, the greater will be the rate of delivery of the granular material in a unit of time. Thus, any of a wide range of rates of delivery may be established by an appropriate setting of the counterpoise and choice of rotational speed of the wheel 22. The rate or amount of feed of the feeder 49 may be arranged by suitable choice size of pulley 52 or speed of motor 50 so that in operation the balance beam swings preferably an equal amount above and below its balance point, thereby ensuring that the average rate of feeding corresponds to the setting of the counterpoise beyond the tare point.

The following data is cited as illustrative of a design for a discharge rate in the order of 1 pound of granular solid (density 1 or greater) per hour: diameter of pulley wheel 22, 12 inches; slope of conical portion 28, 37.5° from horizontal; R. P. M. of pulley wheel 22, 0.6; width of belt 30, 4 inches; width of cylindrical face 29, 1 inch.

Particular advantages of the apparatus are its extreme sensitivity and precision due to the relatively light weight and high carrying capacity of the conveying trough 45 which has more useful length than conventional weigh feeders employing horizontal belt conveyers. While the particular apparatus herein-described is well adapted to carry out the objects of the invention, it is to be understood that the apparatus of the present invention includes all such modifications and changes as come within the scope of the appended claims.

I claim:

1. In a weigh feeder for a granular material, a pair of flat belt pulleys arranged to revolve in a horizontal plane with belt-engaging surfaces vertical; an endless flat belt carried by and turning with the said pulleys on their belt-engaging surfaces, one of said pulleys having a beveled rim portion adjacent to the upper edge of the belt-engaging rim portion adapted to form a V-shaped circular trough between the surface of the bevel and the inside surface of the belt, said trough being capable of carrying granular material as the pulleys turn; chute means adapted to deliver granular material to one end of the trough; counterpoised weighing means adapted to carry and balance the load of the said pair of pulleys, belt, and granular material in said trough; and control means responsive to the weighing means adapted to regulate the amount of granular material delivered to the trough through the chute.

2. In a weigh feeder for a granular material, a balance beam having a short arm and a long arm, said beam being adapted to swing on a fulcrum positioned between the long and short arms of the beam; a balance platform supported by the short arm; a counterpoise on the long arm adapted to counterpoise the load on the balance platform; a pair of flat belt pulleys supported by the balance platform and arranged to revolve in a horizontal plane with belt-engaging surfaces vertical; an endless flat belt carried by and adapted to turn with the said pulleys on their belt-engaging surfaces, one of said pulleys having a beveled rim portion adjacent to the upper edge of the belt-engaging rim portion adapted to form a V-shaped trough between the surface of the bevel and the inside surface of the belt in contact with the same pulley, said trough being capable of carrying granular material as the pulley turns; hopper means above the belt, said hopper having a chute adapted to deliver granular material to the trough; and means responsive to the load on the balance platform adapted to stop the delivery of granular material to the trough through the chute when a predetermined load is exceeded and start the same when the load is less than the predetermined amount.

3. In a weigh feeder, a balance beam having a short arm and a long arm, said beam being adapted to swing on a fulcrum positioned between the long and short arms of the beam; a balance platform supported by the short arm; a counterpoise on the long arm adapted to counterpoise the load on the balance platform; a pair of flat belt pulleys supported by the balance platform and arranged to revolve in a horizontal plane with belt-engaging surfaces vertical; an endless flat belt carried by and adapted to turn with the said pulleys on their belt-engaging surfaces, one of said pulleys having a beveled rim portion adjacent to the upper edge of the belt engaging rim portion adapted to form a V-shaped trough between the surface of the bevel and the inside surface of the belt in contact with the same pulley, said trough being capable of carrying granular material as the pulley turns; hopper means above the belt adapted to hold a quantity of granular material; a chute on the hopper adapted to deliver granular material from the hopper to the trough; a motor driven feeder associated with the chute adapted to release granular material therefrom onto the trough; and electric control means operable by movement of the balance beam to control the said motor driven feeder.

4. In a weigh feeder for a granular material, a pair of flat belt pulleys arranged to revolve in a horizontal plane with belt-engaging surfaces vertical; an endless flat belt carried by and turning with the said pulleys on their belt engaging surfaces, one of said pulleys having a beveled rim portion adjacent to the upper edge of the belt engaging rim portion adapted to form a V-shaped circular trough between the surface of the bevel and the inside surface of the belt, said trough being capable of carrying granular material as the pulleys turn; chute means adapted to deliver granular material to one end of the trough; counterpoised weighing means adapted to carry and balance the load of the said pair of pulleys, belt, and granular material in said trough; control means responsive to the weighing means adapted to regulate the amount of granular material delivered to the trough through the chute; a baffle disposed in the trough adjacent to the end receiving granular material, the said baffle being adapted to prevent granular material deposited in the trough from falling off the said end; a second baffle disposed between the inside surface of the belt and the beveled rim beyond the discharge end of the trough adapted to dislodge granular material tending to stick to the belt and beveled rim beyond the discharge end of the trough.

5. In a weigh feeder for a granular material, a pair of pulley wheels arranged to revolve in a common horizontal plane with their axes vertical, each of said pulleys having a flat belt-engaging rim surface parallel to the axis of rotation, one of the said pulleys having a wide beveled rim portion on the upper side contiguous to the belt-engaging surface, said bevel making an angle with respect to the horizontal at least equal to the slide angle of the granular material to be handled; a flat endless flexible belt mounted on the pair of pulleys so that the inside of the belt frictionally engages the pulleys, said belt forming with the said bevel a V-shaped trough extending along the beveled rim as far as the belt contacts the beveled rim pulley; conduit means above the belt adapted to supply granular material to be handled to one end of the said trough; valve means associated with the conduit for controlling flow therethrough; a collecting means below the beveled rim pulley near the other end of said trough adapted to collect granular material which falls off the bevel at a point where the belt leaves the beveled rim pulley as it turns; a common support for the said pair of pulley wheels; counterpoised weighing means adapted to carry the said common support, responsive to changes in the amount of granular material in said trough; and means associated with said counterpoised weighing means adapted to operate the said valve means to start and stop the flow of the granular material through the said conduit onto the trough as the weight of granular material carried in the trough decreases or increases, respectively, beyond that balanced by the counterpoise.

6. In a weigh feeder for a granular material, a pair of pulley wheels arranged to revolve in a common horizontal plane with their axes vertical, one of said pulleys having a diameter at least five times that of the other, each of said pulley wheels having a flat belt-engaging rim surface parallel to the axis of rotation, the larger pulley wheel having a wide beveled rim portion on the upper side contiguous to the belt-engaging surface, said bevel making an angle with respect to the horizontal at least equal to the slide angle of the granular material to be handled; a flat endless flexible belt mounted on the pair of pulleys so that the inside of the belt frictionally engages the rims of the pulleys, said belt forming with the said bevel a V-shaped trough extending as far as the belt contacts the beveled pulley; conduit means above the belt adapted to supply the granular material to one end of the said trough; valve means associated with the conduit for controlling flow therethrough; motor means adapted to revolve the beveled pulley; a collecting means below the beveled pulley at the other end of said trough adapted to collect granular material which falls off the bevel at the point where the belt leaves the beveled pulley as it turns, said pulleys being carried by a common support; counterpoise means associated with the said common support responsive to changes in the amount of granular material carried in the said trough; and means associated with said counterpoise means adapted to operate the said valve means to start and stop the flow of the granular material through the said conduit onto the said trough when the amount of granular material on the trough decreases and increases, respectively, beyond that balanced by the counterpoise.

7. In a weigh feeder for a granular material, a pulley wheel having a vertical axis of rotation and a rim concentric therewith, said rim having as its periphery a belt-engaging flat surface portion adjacent to the lower side of the pulley wheel and a conical surface portion adjacent to the upper side of the wheel, the lower edge of the conical surface portion adjoining the upper edge of the flat surface portion; a flat endless flexible belt having the inside of a portion of its length frictionally engaging the flat surface portion of the pulley wheel, said belt having a width greater than the width of the flat surface portion of the pulley wheel, whereby to form a V-shaped trough between the conical portion of the pulley wheel and the inside of the said belt adjacent thereto, said trough extending along the portion of the belt in contact with the pulley wheel; idler pulley means adapted to revolve in the plane of the said pulley wheel and to engage the inside surface of the belt to maintain the same taut on the said pulley wheel; a common support for the said pulley wheel and idler pulley; a balance beam having a short arm and a long arm; a fulcrum for the beam, said beam being mounted on the fulcrum between the long and short arms thereof; a vertical support pivoted to the end of the short arm of the balance beam; a link means pivoted to the said vertical supports adapted to maintain the same vertical as the balance beam swings, said common support being carried by the said vertical support; a counterpoise on the long arm of the balance beam adapted to counterbalance the weight of granular material feed to the said V-shaped trough; a supply hopper above the said V-shaped trough adapted to hold a supply of granular material for the weigh feeder, said hopper having a discharge regulating means on the bottom thereof; an outlet on the discharge regulating means positioned above one end of the said trough so as to be capable of discharging granular material from the hopper onto one end of the said V-shaped trough; and means responsive to the swings of the balance beam adapted to control the discharge regulating means on the supply hopper so that the outlet from the hopper closes when the weight on the common support overbalances the counterpoise and opens when the counterpoise overbalances the weight on the common support, thereby to regulate the flow of granular material from the feed hopper in accordance with the weight of granular material in the trough.

RALPH M. WILEY.

REFERENCES CITED

The following references are of record in the file of this patent:

UNITED STATES PATENTS

| Number | Name | Date |
|---|---|---|
| 1,476,223 | Salfisberg | Dec. 4, 1923 |
| 2,322,373 | Lowe | June 22, 1943 |
| 2,343,722 | Wagner | Mar. 7, 1944 |

FOREIGN PATENTS

| Number | Country | Date |
|---|---|---|
| 391,198 | Germany | Oct. 12, 1921 |